United States Patent
Giefer et al.

(10) Patent No.: US 7,210,370 B2
(45) Date of Patent: May 1, 2007

(54) SHIFTING DEVICE FOR AN AUTOMATIC TRANSMISSION

(75) Inventors: Andreas Giefer, Lemförde (DE); Jörg Meyer, Wagenfeld (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 10/939,854

(22) Filed: Sep. 13, 2004

(65) Prior Publication Data

US 2005/0028633 A1    Feb. 10, 2005

Related U.S. Application Data

(63) Continuation of application No. PCT/DE2003/003490, filed on Oct. 17, 2003.

(30) Foreign Application Priority Data

Oct. 21, 2002  (DE) ................................ 102 49 074

(51) Int. Cl.
*B60K 20/00*  (2006.01)
(52) U.S. Cl. ............................. 74/473.18; 74/471 XY
(58) Field of Classification Search ............... 74/473.1, 74/473.18, 473.21, 473.24, 473.25, 473.26, 74/471 XY, 537, 538, 523
See application file for complete search history.

(56) References Cited

U.S. PATENT DOCUMENTS

| | | | |
|---|---|---|---|
| 4,987,792 A | 1/1991 | Mueller et al. | |
| 5,062,314 A | 11/1991 | Maier et al. | |
| 5,220,985 A * | 6/1993 | Annis et al. | 192/219.5 |
| 5,622,079 A * | 4/1997 | Woeste et al. | 74/335 |
| 6,230,579 B1 | 5/2001 | Reasoner et al. | |
| 6,295,886 B1 | 10/2001 | Russell | |

(Continued)

FOREIGN PATENT DOCUMENTS

DE    2 317 593    10/1975

(Continued)

*Primary Examiner*—Richard Ridley
*Assistant Examiner*—James Pilkington
(74) *Attorney, Agent, or Firm*—McGlew & Tuttle, PC

(57) ABSTRACT

A shifting device (4) is provided for an automatic transmission and has an additional manual shifting function. The device includes a selector lever (6), which is mounted pivotably on a gear shift lever (10) such that different, automatically shiftable gears can be preset in a first shift gate (1) and individual, manually shiftable gears can be preset in a second shift gate (2). A housing (5) is provided, in which the gear shift gate (10) is mounted with the selector lever (6) pivotably in such a way that shifting between a predetermined gear ("D") of the first shift gate (1) and a neutral position ("M") of the second shift gate (2) is made possible. The further shifting from the predetermined gear ("D") of the first shift gate (1) into at least one other gear ("3") of the first shift gate is prevented by a lock, which is overcome by the actuation of an actuating element. The lock is formed by a stop (15) of the housing (5) and an intermediate piece (18) arranged on the gear shift gate (10) between the selector lever (6) and the stop (15).

18 Claims, 4 Drawing Sheets

U.S. PATENT DOCUMENTS

| | | | |
|---|---|---|---|
| 6,325,196 B1 * | 12/2001 | Beattie et al. | 192/220.4 |
| 6,382,046 B1 * | 5/2002 | Wang | 74/473.15 |
| 6,386,061 B1 | 5/2002 | Giefer | |
| 6,598,494 B1 * | 7/2003 | Giefer | 74/473.18 |
| 6,732,847 B1 * | 5/2004 | Wang | 192/220.4 |
| 6,857,335 B2 * | 2/2005 | Kahara | 74/473.33 |

FOREIGN PATENT DOCUMENTS

| | | |
|---|---|---|
| DE | 38 07 881 | 9/1989 |
| DE | 39 27 922 | 3/1991 |
| DE | 198 53 934 | 5/2000 |
| EP | 0 899 478 | 3/1999 |

* cited by examiner

SHIFTING DEVICE FOR AN AUTOMATIC TRANSMISSION

CROSS REFERENCE TO RELATED APPLICATION

This is a continuation of and claims the benefit (35 U.S.C. §120 and 365(c)) of copending International Application PCT/DE 2003/003490 of Oct. 17, 2003, which designated inter alia the United States and which claims the priority of German Application DE 102 49 074.0 of Oct. 21, 2002. The entire contents of each application is hereby incorporated by reference in its entirety.

FIELD OF THE INVENTION

The present invention pertains to a shifting device for an automatic transmission with an additional manual shifting function.

BACKGROUND OF THE INVENTION

Such a shifting device is described, for example, in DE 38 07 881 C2. It combines in it the advantage of the shifting of a conventional automatic transmission with those of a transmission to be shifted manually. By pivoting a selector lever, which is mounted pivotably on a gear shifting gate, different automatically shiftable gears, e.g., "P," "R," "N," "D,", "3," "2" and "1" can be preset in a first shift gate. Via a cross gate, the selector lever is shifted over from the first shift gate into a second shift gate, in which individual, manually shiftable gears are preset, e.g., a first gear, a second gear, a third gear and a fourth gear, i.e., the forward gears. The shifting of the manually shiftable gears in the second shift gate is performed by pivoting the selector lever in two opposite directions, e.g., the direction of travel and the direction opposite the direction of travel, as a result of which a plus sensor and a minus sensor respond, which initiate an upshifting or downshifting of the manual gears.

Shifting between defined gears in the first shift gate is usually prevented in such shifting devices by a lock, which can be overcome by actuating an actuating element. For example, shifting from the gear "P" into the gear "R" is possible only by actuating the actuating element simultaneously with the application of the brake. The actuating element is usually a pushbutton at the knob of the selector lever. Shifting from "P" to "R," from "R" to "P" and from "N" to "R" usually also requires the actuation of an actuating element to overcome the shift lock.

If the automatic shifting device is a shifting device with an additional tip shifting function (manual shifting or Tiptronic), the selector lever is usually pivoted from the gear "D" via the cross gate into the second shift gate, where the individual gears can be selected manually by tapping or pivoting the selector lever in the "+" and "−" directions. The selector lever, which is mounted pivotably on the gear shift gate for selecting the individual gears in the two gates, is pivoted together with the gear shift gate during the shifting from the first shift gate into the second shift gate. The shift locks referred to above are usually seated on the gear shift gate, because they are to block the pivoting of the selector lever on the gear shift gate. If additional gears, which can be selected only after overcoming the shift lock, are provided after the gear "D," the movement of the selector lever in the second shift gate is thus also blocked in one of the two directions for selecting the manually shiftable gates. However, this is not desirable, because no shift locks shall be provided precisely during the manual shifting, and the manual shifting shall be made possible by a slight tapping or pivoting of the selector lever.

SUMMARY OF THE INVENTION

The object of the present invention is therefore to make available a shifting device for an automatic transmission of the above-described type with an additional manual shifting function, which prevents the pivoting of the selector lever from a predetermined gear into at least one other gear in the first shift gate by a lock that can be overcome by means of an actuating element, but which makes possible the pivoting of the selector lever in the second shift gate for selecting the individual, manually shiftable gears without a lock.

The shifting device according to the present invention comprises a selector lever, which is mounted pivotably on a gear shift pivot member such that different, automatically shiftable gears can be preset in a first shift gate and individual, manually shiftable gears can be preset in a second shift gate, and a housing, in which the gear shift pivot member is mounted pivotably with the selector lever in such a way that shifting between a predetermined gear of the first shift gate and a neutral position of the second shift gate is made possible. The further shifting from the predetermined gear, e.g., the gear "D," of the first shift gate into at least one other gear of the first shift gate, e.g., "3" or "2," is prevented by a lock, which is overcome by actuating an actuating element. The lock is formed according to the present invention by a stop of the housing and an intermediate piece arranged on the gear shift pivot member between the selector lever and the stop.

The intermediate piece is therefore used as a stop for the selector lever in the first shift gate during the attempt of shifting further from the predetermined gear into the other gear and blocks this movement, because it is in contact with the housing. This lock can be overcome by actuating the actuating element. The intermediate piece and the housing are designed such that they do not hinder the movement of the selector lever in the second shift gate.

Thus, the present invention makes possible the movement of the shift lock from the predetermined gear into the at least one other gear in the first shift gate and the free pivoting of the selector lever in the second shift gate without a great effort and in a highly effective manner.

The housing is advantageously designed such that the selector lever is freely movable during actuation in the second shift gate without being hindered by the intermediate piece. The housing advantageously forms a recess, which is engaged by the intermediate piece during the actuation of the selector lever in the second shift gate.

According to the present invention, the intermediate piece may be arranged movably on the gear shift pivot member and moved by the selector lever during the actuation of the selector lever in the second shift gate. The intermediate piece is returned by a spring into its starting position after being moved by the selector lever.

The selector lever advantageously comprises a locking bar, which prevents the further shifting from the predetermined gear of the first shift gate into at least one other gear of the first shift gate by pressing the intermediate piece against the stop of the housing, wherein the locking bar is raised by actuating the actuating element via the intermediate piece, so that the further shifting is made possible.

Corresponding to a practical embodiment of the present invention, the predetermined gear may be a "D" gear and the at least one other gear of the first shift gate may be a "3" or "2" gear.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
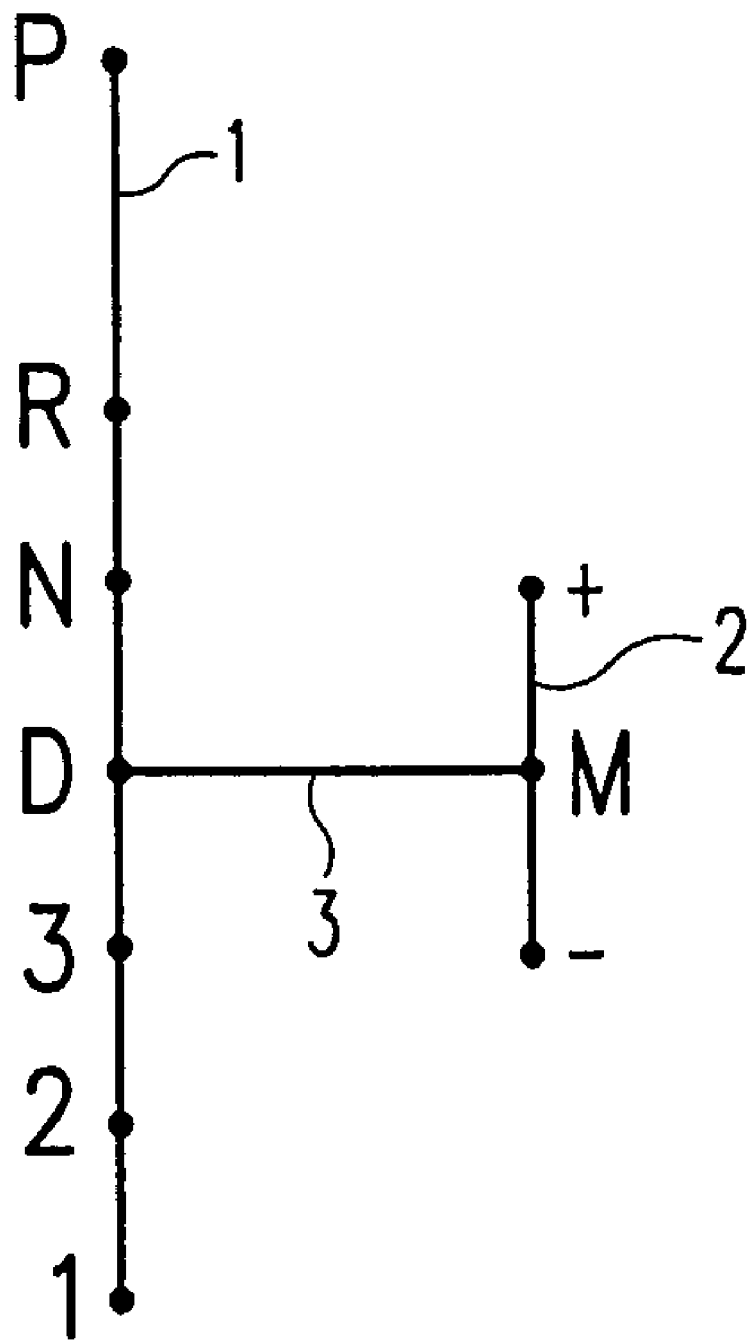
FIG. 1 is an exemplary shifting diagram of an exemplary embodiment of a shifting device according to the present invention.

Referring to the drawings in particular, FIG. 1 shows a shifting diagram of a shifting device according to the present invention, which is explained in greater detail in an exemplary embodiment shown in FIGS. 2–6. The shifting diagram shows a first shift gate 1 with the automatically shiftable gears "P," "R," "M," "D," "3," "2" and "1," as well as a second shift gate 2 for shifting individual, manually shiftable gears. Upshifting or downshifting of the manual gears, e.g., a first through fourth gear, is brought about here in the second shift gate from a neutral position "M" by pivoting the selector lever in a "+" position and a "−" position. After pivoting or tapping the selector lever from the neutral position "M" in the "+" position or the "−" position, the selector lever automatically returns into the neutral starting position "M." The pivoting of the selector lever from the first shift gate 1 into the second shift gate 2 is achieved via a cross gate 3, which connects a predetermined gear of the first shift gate, usually the gear "D," with the neutral position "M" of the second shift gate.

It shall be emphasized that the shifting diagram shown in FIG. 1 is only an example, and other arrangements of the gear and shift positions are possible. For example, the gear "D" in the first shift gate 1 may be followed by only two other gears "2" and "1" or even by only a single gear, e.g., "S."

Figure 2:
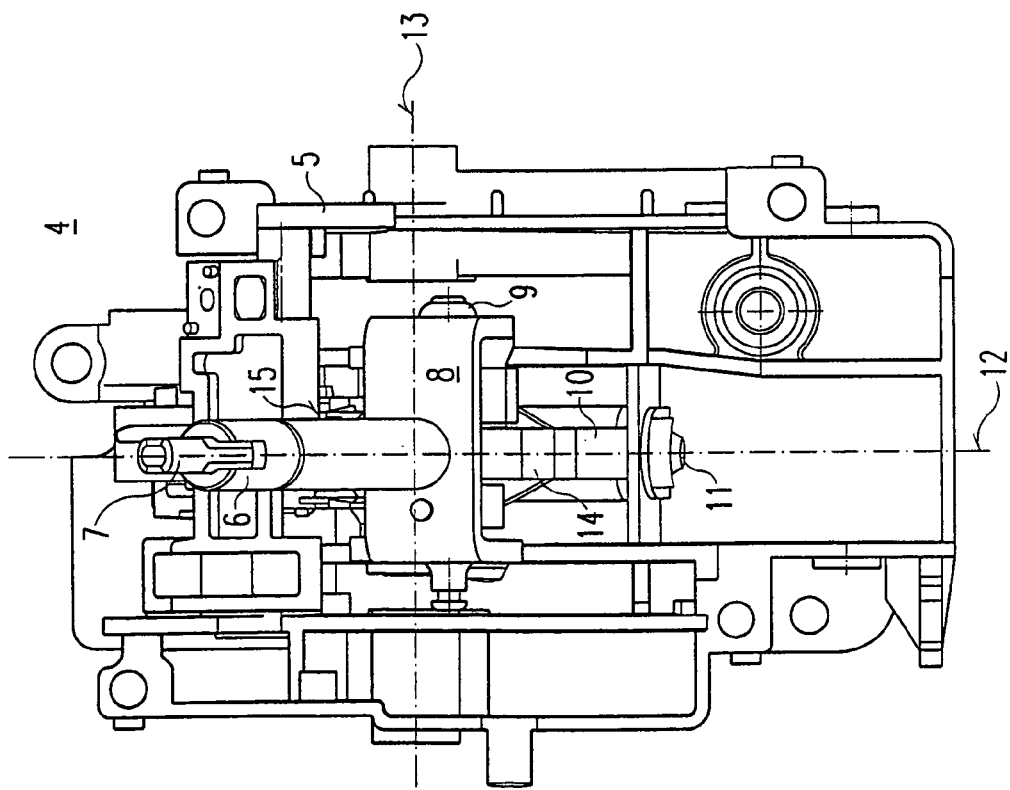
FIG. 2 is a perspective view of the exemplary embodiment of the shifting device according to the present invention with the selector lever in the first shift gate.

FIG. 2 shows a perspective view of an exemplary embodiment of a shifting device 4 according to the present invention. The shifting device 4 shown makes possible the selection of gears, e.g., according to the shifting diagram shown in FIG. 1.

The shifting device 4 comprises a housing 5, in which a gear shifting gate 10 with a selector lever 6 is mounted pivotably between a first shift gate and a second shift gate. The pivotable mounting of the gear shift pivot member 10 in the housing 5 is indicated by a rotatable mount 11 and an axis of rotation 12. The selector lever 6 is an automatic gearshift lever of the prior-art design and projects upward from the shifting device 4 (in the installed state). A locking bar 7, which is part of the shift lock for blocking the shifting between defined gears, is arranged in its interior. The locking bar 7 is movable by an actuating element in order to release the shift lock. The actuating element is, for example, a pushbutton at the knob (not shown) of the selector lever 6.

The selector lever 6 is mounted pivotably by means of an attachment 8 on the gear shift pivot member 10. The pivotable mounting is indicated by a rotatable fastening 9 and an axis of rotation 13. Due to the pivotable mounting of the selector lever 6 at the gear shift pivot member 10, the automatically shiftable gears in the first shift gate 1 and the manually shiftable gears of the second shift gate 2 can be preselected, e.g., according to the shifting diagram shown in FIG. 1. In the view in FIG. 2, the gear shift pivot member 10 and the selector lever 6 are arranged in the first shift gate 1, which extends in the longitudinal direction of the drawing plane. The different, automatically shiftable gears of the shift gate 1 are arranged in one line one after another along this direction. The transverse direction to the drawing plane is the direction of the cross gate 3, through which the selector lever 6 can be moved into the second shift gate. The first shift gate and the cross gate 3 are at right angles to one another. The second shift gate 2 likewise extends in the longitudinal direction of the drawing plane, and it is likewise at right angles to the cross gate 3. The second shift gate 2 and the first shift gate are thus parallel to one another.

Figure 3:
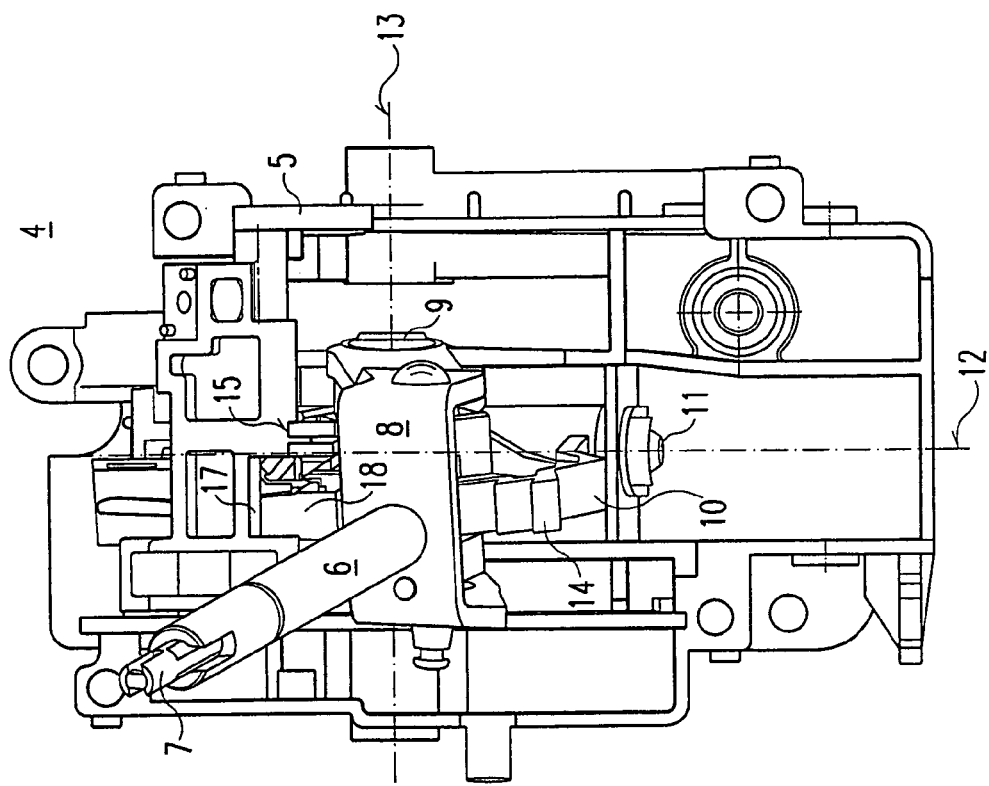
FIG. 3 is a perspective view of the exemplary embodiment shown in FIG. 2 with the selector lever in the second shift gate.

FIG. 3 shows a perspective view, which shows the exemplary embodiment of the shifting device 4 according to FIG. 2, in which the gear shift pivot member 10 and the selector lever 6 are arranged, however, in the second shift gate. The selector lever 6 is shown in FIG. 2 in the position in which the gear "D" is selected, starting from which a movement is possible into the cross gate 3 for shifting into the second shift gate. FIG. 3 correspondingly shows the selector lever 6 in the neutral position "M" in the second shift gate 2. The rearward movement of the selector lever from the gear "D" in the shift gate 1 in the direction of the second gear "3" is prevented by a lock. The direction of movement of the selector lever 6 from gear "D" to gear "3" is the upward and rearward direction in the drawing plane of FIG. 2. The shifting direction from gear "D" to gear "N," "R" and "P" is the upward and downward movement in the drawing plane of FIG. 2, i.e., in the direction of a stop 14 on the gear shift pivot member 10. The stop 14 is used as a stop of the selector lever for the gear "P."

In gear "D" the selector lever 6 is in contact with a stop 15 of the housing 5 via an intermediate piece 18, so that further shifting from the gear "D" is not readily possible. The stop 15, the housing 5 and the intermediate piece 18 therefore form a lock, which prevents a further shifting from "D" to "3." This can be clearly recognized from the sectional view of the gear shift pivot member 10 and the selector lever 6 in FIG. 4. The selector lever 6 is in the gear "D" in the first shift gate. To pivot the selector lever 6 into the gear "3," it would have to be pivoted to the right, i.e., clockwise. However, the movement is prevented here by the intermediate piece 18, which is pressed by the locking bar 7 of the selector lever 6 against the stop 15 of the housing 5. By pressing the actuating element, e.g., the button at the knob of the selector lever 6, the locking bar 7 is raised or moved upward and it is no longer in contact with the intermediate piece 18. As a result, the selector lever 6 can be moved farther in the rearward direction in the direction of gear "3."

Figure 5:
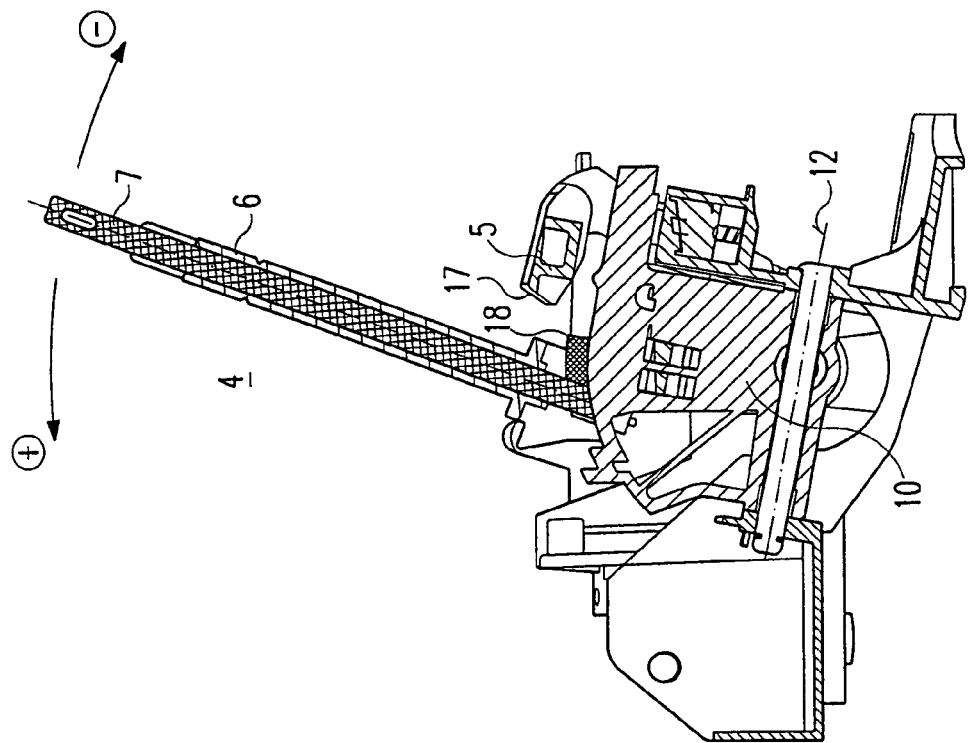
FIG. 5 is a sectional view of a part of the exemplary embodiment of the shifting device according to the present invention shown in FIGS. 2 and 3 with the selector lever in the second shift gate.
Figure 4:
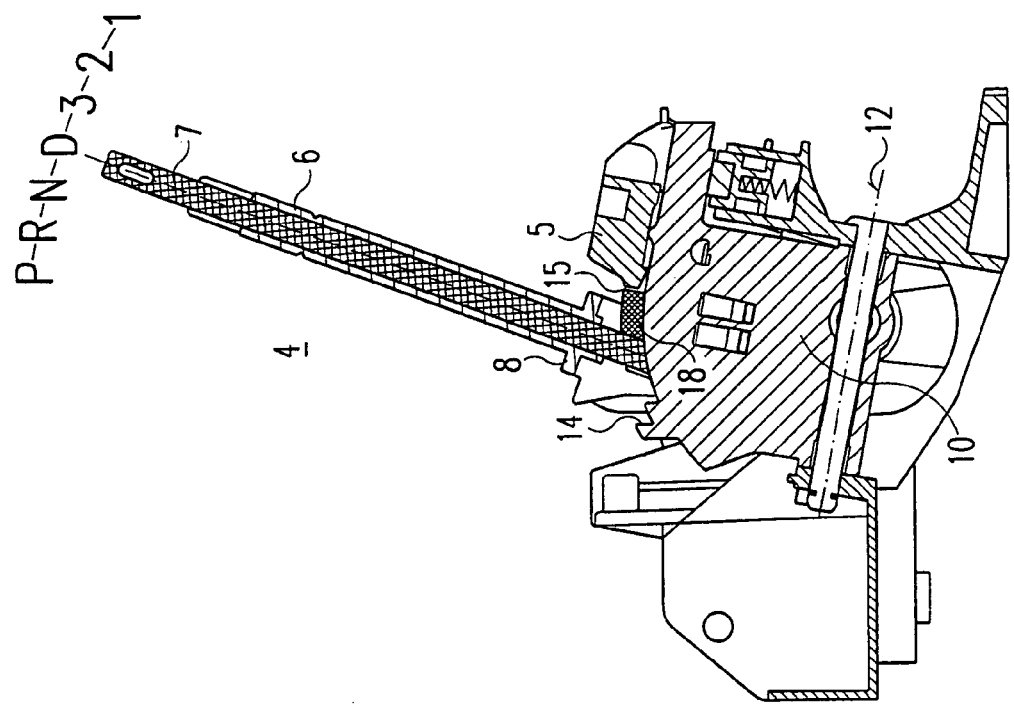
FIG. 4 is a sectional side view of a part of the exemplary embodiment of the shifting device according to the present invention shown in FIGS. 2 and 3 with the selector lever in the first shift gate.

As is shown in the sectional view of the gear shift pivot member 10 and of the selector lever 6 in FIG. 5, the housing 5 has such a shape that the intermediate piece 18 is not in contact with the housing 5 when the gear shift pivot member 10 and the selector lever 6 are pivoted into the second shift gate. As can be recognized from FIG. 3, the housing 5 forms at a corresponding site a recess, which is limited by the edge 17. This recess is located next to the stop 15 in the second shift gate 2. The selector lever 6 is shown in FIG. 5 in the neutral position M of the second shift gate. The manually shiftable gears can be preset by tapping or pivoting the selector lever 6 in the forward direction ("+" direction) or rearward direction ("−" direction). The rearward movement of the selector lever 6 is not hindered now by a stop of the intermediate piece 18 at the housing 5, but the selector lever 6 and the intermediate piece 18 are freely movable. Manual shifting is possible without hindrance as a result.

Figure 6:
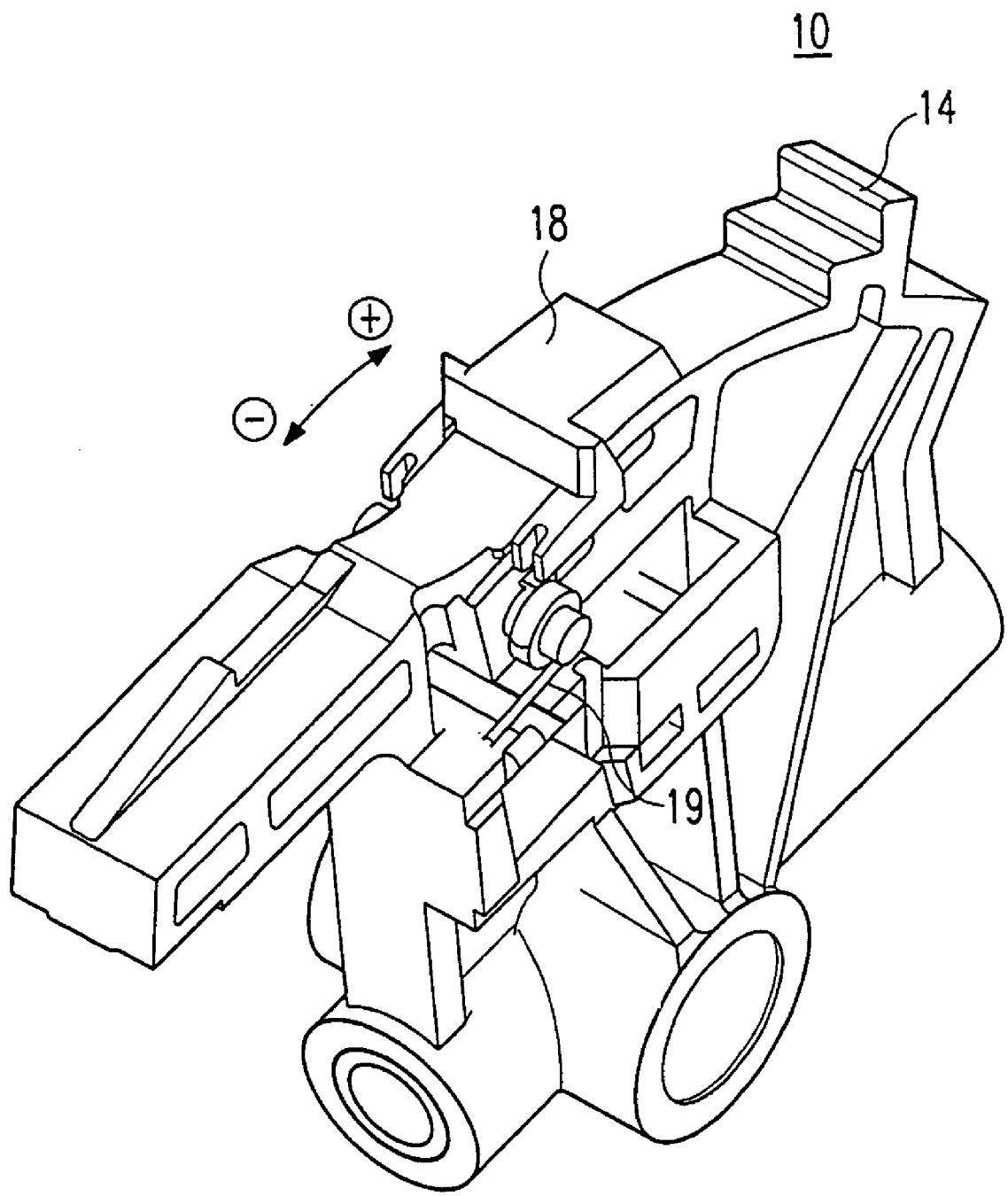
FIG. 6 is a perspective view of the gear shift pivot member with the movable intermediate piece of the exemplary embodiment of the shifting device according to the present invention shown in FIGS. 2–5.

The intermediate piece 18 is movable or displaceable on the gear shift pivot member 10, as can be recognized from the perspective view of the gear shift pivot member 10 in FIG. 6. The intermediate piece 18 is seated and slides on a slightly rounded path of movement of the gear shift pivot member 10. The rearward movement of the intermediate piece 18 (in the "−" direction) is triggered now by the selector lever 6 or the locking bar 7 of the selector lever. Therefore, when the selector lever 6 is pivoted in the "−" direction for the manual downshifting of individual gears and it automatically returns into the neutral position "M," the intermediate piece 18 is likewise displaced in the "−" position. To guarantee that the intermediate piece 18 will again return into its starting position, a spring 19 is provided, which returns the intermediate piece 18 into its starting position.

While a specific embodiment of the invention has been shown and described in detail to illustrate the application of the principles of the invention, it will be understood that the invention may be embodied otherwise without departing from such principles.

What is claimed is:

1. A shifting device for an automatic transmission with an additional manual shifting function, the shifting device comprising:
    a gear shift pivot member;
    a selector lever mounted pivotably on said gear shift pivot member such that different, automatically shiftable gears can be selected in a first shift gate and individual, manually shiftable gears can be selected in a second shift gate;
    a housing, said gear shift pivot member being mounted pivotably with said selector lever to said housing such that shifting between a predetermined gear of said first shift gate and a neutral position of said second shift gate is made possible;
    an actuating element and lock wherein a further shifting from said predetermined gear of said first shift gate into at least one other gear of said first shift gate is prevented by said lock, said lock being overcome by actuating said actuating element, said lock being formed by a stop supported at said housing and an intermediate piece arranged on said gear shift pivot member between said selector lever and said stop.

2. A shifting device in accordance with claim 1, wherein said housing is designed such that said selector lever is freely movable during actuation in said second shift gate without being blocked by said intermediate piece.

3. A shifting device in accordance with claim 2, wherein said housing forms a recess, which is engaged by said intermediate piece during the actuation of said selector lever in said second shift gate.

4. A shifting device in accordance with claim 1, wherein said intermediate piece is arranged movably on said gear shift pivot member and is moved by said selector lever during the actuation of said selector lever in said second shift gate.

5. A shifting device in accordance with claim 4, further comprising: a spring provided on said shift pivot member wherein said intermediate piece is returned by said spring into a starting position after being moved by said selector lever.

6. A shifting device in accordance with claim 1, wherein said selector lever comprises a locking bar, which prevents the further shifting from said predetermined gear of said first shift gate into said at least one other gear of said first shift gate by pressing said intermediate piece against said stop of said housing, wherein said locking bar is raised by an actuation of said actuating element to pass above said intermediate piece, so that further shifting is made possible.

7. A shifting device in accordance with claim 1, wherein said predetermined gear is a the drive ("D") gear, and the at least one other gear of said first shift gate is a third ("3") or a second ("2") gear.

8. A shifting assembly in accordance with claim 1, wherein said selector lever comprises a locking bar that is moveable relative to said intermediate piece upon actuation of said actuating element.

9. A gear shifting assembly for an automatic transmission with an additional manual shifting function, the shifting assembly comprising:
    a selector lever;
    a gear shift pivot member for moving with said selector lever such that different, automatically shiftable gears can be selected in a first shift gate and individual, manually shiftable gears can be selected in a second shift gate;
    a housing, said gear shift pivot member being mounted pivotably with said selector lever to said housing such that shifting between a predetermined gear of said first shift gate and a neutral position of said second shift gate is made possible;
    an actuating element associated with said selector lever; and
    a lock for preventing a further shifting from said predetermined gear of said first shift gate into at least one other gear of said first shift gate in a lock position and being in an unlocked position upon actuating said actuating element, said lock including a stop on said housing and an intermediate piece arranged on said gear shift pivot member between said selector lever and said stop, wherein upon movement of said selector lever in a rearward direction toward said at least one other gear in said unlocked position, said intermediate piece is blocked by said stop and said selector member moves relative to said intermediate piece whereby said selector member is able to move in said rearward direction into said at least one other gear.

10. A shifting assembly in accordance with claim 9, wherein said housing defines a space in which said selector lever is freely movable during actuation in said second shift gate without being blocked by said intermediate piece.

11. A shifting assembly in accordance with claim 10, wherein said housing forms a recess, which is engaged by said intermediate piece during the actuation of said selector lever in said second shift gate.

12. A shifting assembly in accordance with claim 9, wherein said intermediate piece is arranged movably on said gear shift pivot member and is moved by said selector lever during the actuation of said selector lever in said second shift gate.

13. A shifting assembly in accordance with claim 12, wherein said intermediate piece is returned by a spring into a starting position after being moved by said selector lever.

14. A shifting assembly in accordance with claim 9, wherein said selector lever comprises a locking bar, which prevents the further shifting from said predetermined gear of said first shift gate into said at least one other gear of said first shift gate by pressing said intermediate piece against said stop of said housing, wherein said locking bar is raised by an actuation of said actuating element over said intermediate piece, so that further shifting is made possible.

15. A shifting assembly in accordance with claim 9, wherein said predetermined gear is a the drive ("D") gear, and the at least one other gear of said first shift gate is a third ("3") or a second ("2") gear.

16. A shifting assembly in accordance with claim 9, wherein said intermediate piece is movable with said gear shift pivot member relative to said stop when said selector lever is moved from said first shift gate into said second shift gate and from said second shift gate into said first shift gate.

17. A gear shifting assembly for an automatic transmission, the shifting assembly comprising:

a housing;

a selector lever;

a gear shift pivot member, said selector lever being pivotally mounted to said pivot member and said pivot member being pivotally mounted to said housing for moving with said selector lever such that different, automatically shiftable gears can be selected in a first shift gate and individual, manually shiftable gears can be selected in a second shift gate with said first shift gate connected to said second shift gate by a cross gate;

an actuating element associated with said selector lever; and a lock for preventing a further shifting from a predetermined gear of said first shift gate into at least one other gear of said first shift gate in a locked position and being in an unlocked position upon actuating said actuating element, said lock including a stop connected to and supported on said housing and an intermediate piece mounted to move along a region on said gear shift pivot member, said intermediate piece being between said selector lever and said stop with said selector lever in said first shift gate to block movement of said intermediate piece and said selector lever in a rearward direction toward said at least one other gear in said locked position wherein upon movement of said selector lever in a rearward direction toward said at least one other gear in said unlocked position, said intermediate piece remains blocked by said stop and said selector member moves relative to said intermediate piece whereby said selector member is able to move in said rearward direction into said at least one other gear, and in said locked position said intermediate piece not being blocked by said stop in said second shift gate wherein said selector lever and said intermediate piece move relative to said pivot member and said housing as said selector lever moves m said second shift gate.

18. A shifting assembly in accordance with claim 17, wherein said housing defines a recess adjacent to said stop whereby said intermediate member is movable into said recess as said selector lever moves in said second shift gate.

\* \* \* \* \*